J. G. HEINRICH, Jr.
FISHING POLE.
APPLICATION FILED MAR. 21, 1914.
1,157,106.
Patented Oct. 19, 1915.
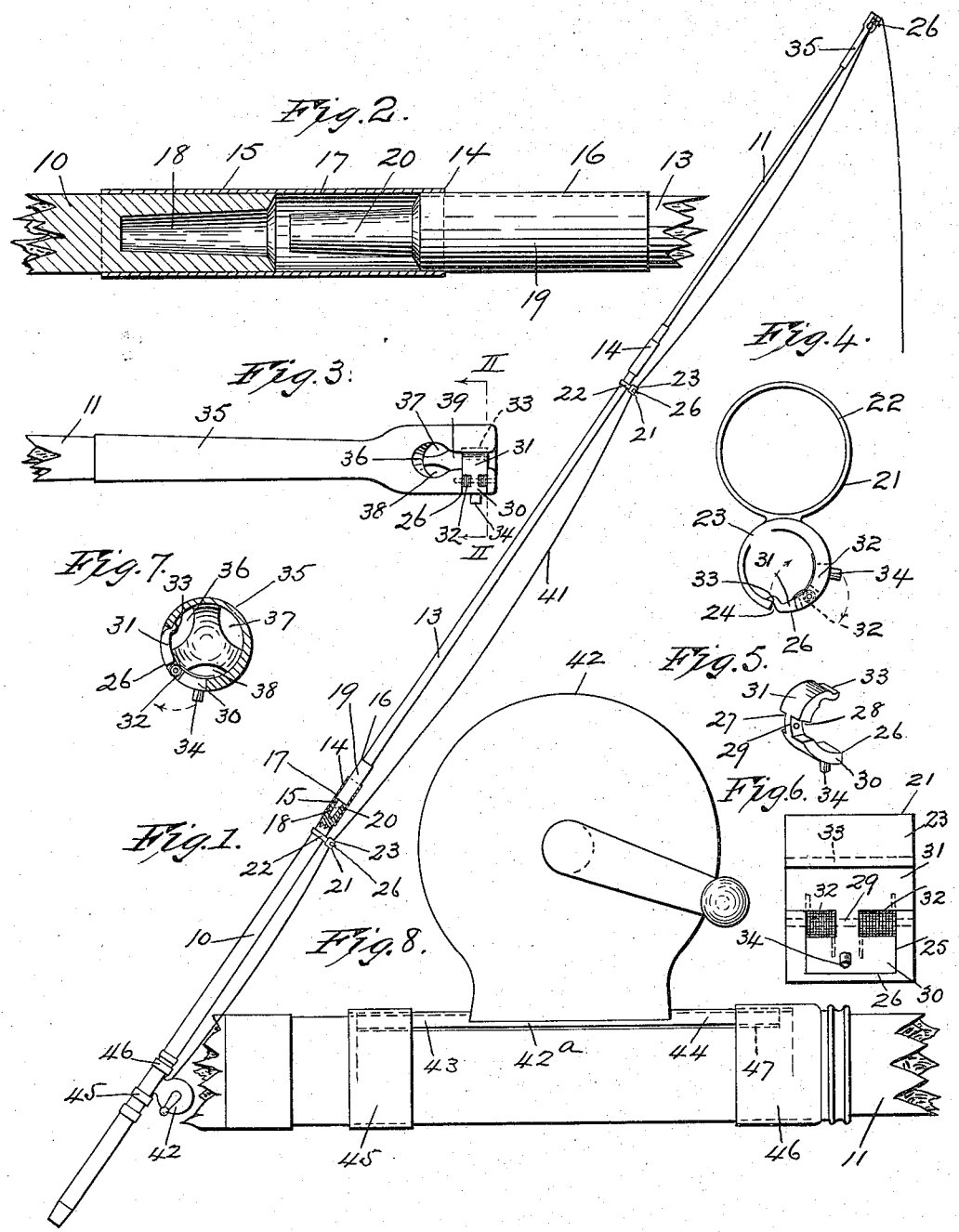

UNITED STATES PATENT OFFICE.

JOHN G. HEINRICH, JR., OF NEW ROCHELLE, NEW YORK.

FISHING-POLE.

1,157,106.  Specification of Letters Patent.  Patented Oct. 19, 1915.

Application filed March 21, 1914. Serial No. 826,259.

*To all whom it may concern:*

Be it known that I, JOHN G. HEINRICH, Jr., a citizen of the United States, and a resident of New Rochelle, county of Westchester, and State of New York, have invented a certain new and useful Improvement in Fishing-Poles, of which the following is a full, clear, and exact specification.

This invention relates to a class of devices adapted to be used for fishing.

My invention has for its object primarily to provide a fishing pole having a number of sections whereby the device may be arranged into a compact parcel so as to be conveniently carried by a person or the sections may be detachably connected together when it is desired to use the pole, and this is accomplished mainly by employing upon the sections forms of connecting elements each composed of two interfitting complemental members, one being in the form of a socket having a communicating tapered recess and the other member being in the form of a ferrule having a projecting tapered finger. When the sections of the pole are assembled each of the ferrules and its finger are inserted in the socket and recess of its complemental member, and by providing the tapered fingers and the tapered parts of the sockets great strength and durability will be given to the sections of the pole as well as tending to prevent the parts of the connecting elements from becoming loose as is incident to fishing poles of sectional forms wherein the recesses of the connecting joints have straight walls and the interfitting fingers being also in straight rod-like shapes.

Another object of the invention is to provide line guides constructed with spring actuated gates whereby the fishing line may be readily applied to the pole or removed therefrom, instead of requiring the line to be guided through a series of rings which often require parts of the line to be cut in order to detach it from the pole; and a further object of the invention is to provide a fishing pole of simple and efficient construction, and which is susceptible of being made in any desired size.

With these and other objects in view, the invention will be hereinafter more particularly described with reference to the accompanying drawing which forms a part of this specification, and will then be pointed out in the claims at the end of the description.

In the drawing, Figure 1 is an elevation, partly in section, of one form of fishing pole embodying my invention. Fig. 2 is an enlarged fragmentary view, partly in detail and partly in section, showing the manner of detachably connecting two of the sections of the pole by the use of one of the connecting elements. Fig. 3 is a fragmentary elevation of the pole showing the cap piece. Fig. 4 is an enlarged edge view of one of the line guides. Fig. 5 is an enlarged perspective of one of the gates used in the line guides. Fig. 6 is an enlarged inverted plan of the line guide shown in Fig. 4. Fig. 7 is an enlarged section taken on the line II—II of Fig. 3; and Fig. 8 is an enlarged fragmentary view showing the manner of detachably applying a reel to the pole.

The fishing pole has a handle section 10, a tip section 11, and one or a number of intermediate sections 13, all of which may be of any desired lengths, and these sections are adapted to be detachably connected when it is desired to use the pole, or when the pole is not in use the sections may be arranged into a compact parcel so as to be conveniently carried by a person as is customary with fishing poles of this class.

Serving to permit the sections of the pole to be detachably connected, I provide a number of connecting elements, as 14, all of which are alike in formation. Each of the connecting elements is composed of two interfitting complemental members, as 15 and 16. Each of the complemental members 15 is in the form of a socket 17 provided by mounting a tube of metal, or other suitable material on one of the corresponding ends of the handle section and on the intermediate section of the pole in a manner whereby part thereof will protrude some distance beyond the end of its respective section, and the interior of this projecting part of the tube forms the socket proper. The socket 17 has a communicating tapered recess, as 18, which is preferably provided by boring the end of the section upon which each of the tubes is mounted. Each of the complemental members 16 is composed of a ferrule 19 which is mounted on the end of the section in opposed relation to the socket of the next adjacent member, and extending from the free end of each ferrule is a finger 20 which is tapered to conform with the recess 18 of its complemental member 15, but each finger is of a diameter so as to fit closely when removably interfitted in the recess.

When assembling the sections of the pole the intermediate section 13 is disposed so that its ferrule 19 and its tapered finger 20 will be inserted in the socket 17 and in its communicating tapered recess 18 of the handle section 10 by directing the sections toward each other, and the tip section 13 is then detachably connected to the other end of the intermediate section in a similar manner. By providing the fingers 20 and parts of the sockets 17 in tapered forms great strength and durability will be given to the pole when the sections are connected as well as serving to prevent the parts of the connecting elements from becoming loose as is incident to forms of fishing poles of this class wherein the recesses of these connecting joints have straight walls and the interfitting fingers being also in straight rod-like shapes which often prove of insufficient strength to prevent the sections of the pole from wabbling when connected together.

In order to permit a fishing line to be readily applied to or removed from the pole, I provide a number of line guides, as 21, all of which are similarly formed. Each of the line guides 21 has a supporting ring 22, one of which is mounted on each section of the pole, and from each of the supporting rings is a second ring, as 23, depending therefrom. Each of the rings 23 has its lower part cut-out, at 24, to provide two spaced ends, and in one of these ends is a slot 25 extending lengthwise thereof. The cut-out 24 of each of the rings is closed by a gate 26 which is curved to conform with the curvature of the ring, and in the side edges of the central part of each gate are two notches, as 27 and 28, which provide a connecting strip 29 and two oppositely extending arms 30 and 31. The arm 30 of each gate is movably disposed in the slot 25 of its ring, and the arm 31 of each gate bridges the cut-out of the ring. Through the strip 29 of each of the gates is an opening, and also through the slotted end of each of the rings 24 are openings which register with the opening of the strip of each gate. Each gate is pivoted to its ring by passing a pintle through these registered openings, and encircling each pintle is one or two spiral springs 32 formed so that their ends engage the inner surfaces of each ring and its gate so as to normally tend to swing the arm 31 of the gate in a direction outwardly of the cut-out of the ring. In order to prevent the arms 31 of each of the gates from moving outwardly through the cut-out of its ring upon the free end of each of these arms is formed a lip 33 extending inwardly of the rings so as to overlap the opposed end thereof at its cut-out, as shown, and to permit the gates to be manually swung on their pivots, projecting from the arm 30 of each gate is a lug or pin 34. Upon the end of the section 11 of the pole which is opposite to its ferrule 19 is a cap 35, and through the wall of this cap adjacent to its free end are three spaced passages, as 36, 37, 38, which extend in relative triangular arrangement lengthwise of the cap and through its free end. The wall of one of the passages is cut-out at 39, and this cut-out portion is bridged by a swinging gate which corresponds to the formation and is operated like all of the gates 26. If desired forms of the fishing pole may be made wherein the cap 35 is dispensed with and one of the forms of the line guide 21 may be used instead. To apply a fishing line, as 41, to the line guides of this form of fishing pole, the pin 34 of the gate of each of the line guides is directed so as to guide the arm 30 of each gate in a direction outwardly from the ring 23, and the arm 31 of each gate will thereby be swung inwardly of the ring against the tension of the spring of the gate. The line is then passed through the opening of the ring of each of the line guides. In this manner the fishing line will be properly applied to the pole, and the line may be readily removed from the pole by reversely operating the gates of the line guides, thus obviating the necessity to cut the fishing line in order to remove it from the pole as is often required with fishing poles of the usual makes.

In conjunction with the fishing pole may be used any suitable form of reel, as 42, upon which the fishing line 41 is wrapped. The reel 42 has the usual base-plate 42$^a$ the ends 43 and 44 of which extend in opposite lateral directions from the reel proper, and this base-plate is curved similarly to the shape of the handle section of the pole. On the handle section 10 of the pole is a slidable ring, as 45, which is larger in diameter than the handle section, and spaced some distance from this ring on the handle section is rigidly mounted a second ring 46. The ring 46 is of a shape and diameter so that a part thereof is spaced from the handle section to provide a groove 47 between the ring and the handle sections. To detachably mount the reel 42 on the handle section, the base-plate 43 is positioned on the section, and the reel is moved so that the end 44 of the base-plate will be inserted in the groove 47. By then sliding the ring 45 toward the reel it will pass over the end 43 of the base-plate 42$^a$ for holding the reel against accidental displacement to the fishing pole, and by reversely moving the slidable ring 45 and the base-plate 43 the reel may be easily removed from the handle section of the pole.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. In a fishing pole, a line guide comprising an apertured portion having an attaching portion for securing it to a pole or section thereof, said apertured portion having a cut-out in the operative part thereof, and a spring-actuated gate connected to the apertured portion and adapted to overlie the same at one end of the cut-out, said gate being designed to be moved on its connection for opening the cut-out to permit the line to be passed into or out of the apertured portion in a plane at right angles to the length of the line.

2. In a fishing pole line guide, an open-like body, an attaching portion integral therewith for mounting the body on the pole, said body having a cut-out with one end thereof slotted and bounded on two sides by walls of the body, and a gate pivoted in said cut-out to provide oppositely extending arms, one of which overlies the cut-out and the other of which is movably disposed in the slotted end of the cut-out, means to normally hold the gate in the last-named position, and means at the arm of the gate engaging in the slotted end of the cut-out for swinging said arm outwardly and to swing the other arm inwardly, whereby to permit the line to be passed through the cut-out in either direction at any point between the ends of the line.

3. A line guide for fishing poles, comprising a circular portion having an attaching part to engage around a pole, said circular portion being in the form of a ring having a cut-out in its wall at a point substantially of maximum distance from the pole and attaching part, said cut-out having a slotted portion at one end bounded on three sides by portions of the circular portion, a gate pivoted in the cut-out between two of said sides and between its ends to provide two arms, one bridging the cut-out beyond the pivot of the gate to swing inwardly and the other arm engaging in the slot and adapted to swing outwardly, springs mounted on the pivot and engaging the circular portion and gate respectively, to hold said arms in the first-named positions thereof, and a lug projecting outwardly from the latter arm to permit the arms to be moved to the last-mentioned positions by moving the gate on its pivot, as and for the purposes specified.

This specification signed and witnessed this twentieth day of March A. D. 1914.

JOHN G. HEINRICH, Jr.

Witnesses:
JOHN HEINRICH,
M. DERMODY.

Copies of this patent may be obtained for five cents each, by addressing the "Commissioner of Patents, Washington, D. C."